US012456447B2

(12) United States Patent
Shields et al.

(10) Patent No.: US 12,456,447 B2
(45) Date of Patent: Oct. 28, 2025

(54) TOOLS AND METHODS FOR DESIGNING FILTERS FOR USE IN ACTIVE NOISE CANCELLING SYSTEMS

(71) Applicant: Renesas Design Netherlands B.V., 's-Hertogenbosch (NL)

(72) Inventors: Paul Shields, Dunblane (GB); Wessel Harm Lubberhuizen, Hengelo (NL); Fotios Kontomichos, Patras (GR)

(73) Assignee: Renesas Design Netherlands B.V., 's-Hertogenbosch (NL)

( * ) Notice: Subject to any disclaimer, the term of this patent is extended or adjusted under 35 U.S.C. 154(b) by 335 days.

(21) Appl. No.: 18/066,332

(22) Filed: Dec. 15, 2022

(65) Prior Publication Data

US 2024/0203391 A1 Jun. 20, 2024

(51) Int. Cl.
*G10K 11/178* (2006.01)

(52) U.S. Cl.
CPC .. *G10K 11/17817* (2018.01); *G10K 11/17823* (2018.01); *G10K 11/17825* (2018.01); *G10K 11/17881* (2018.01); *G10K 2210/3022* (2013.01); *G10K 2210/3026* (2013.01); *G10K 2210/3027* (2013.01); *G10K 2210/3028* (2013.01); *G10K 2210/3055* (2013.01)

(58) Field of Classification Search
CPC ....... G10K 11/17817; G10K 11/17823; G10K 11/17825; G10K 11/17881; G10K 2210/3022; G10K 2210/3026; G10K 2210/3027; G10K 2210/3028; G10K 2210/3055
USPC ....................................................... 381/71.11
See application file for complete search history.

(56) References Cited

U.S. PATENT DOCUMENTS

| | | | | |
|---|---|---|---|---|
| 5,182,774 | A | 1/1993 | Bourk | |
| 5,425,105 | A | 6/1995 | Lo et al. | |
| 6,278,786 | B1 | 8/2001 | McIntosh | |
| 6,683,960 | B1 * | 1/2004 | Fujii | G10K 11/17854 381/71.8 |
| 8,798,283 | B2 | 8/2014 | Gauger, Jr. et al. | |
| 9,437,182 | B2 | 9/2016 | Doclo | |
| 9,837,066 | B2 | 12/2017 | Wurtz | |
| 10,034,092 | B1 | 7/2018 | Nawfal et al. | |
| 10,950,213 | B1 | 3/2021 | Lu et al. | |
| 11,189,261 | B1 | 11/2021 | Lu et al. | |
| 11,303,258 | B1 * | 4/2022 | Bajic | G10K 11/17854 |
| 11,404,040 | B1 | 8/2022 | Kontomichos et al. | |
| 2004/0264706 | A1 | 12/2004 | Ray et al. | |
| 2010/0002889 | A1 | 1/2010 | Jorgensen et al. | |
| 2010/0166206 | A1 | 7/2010 | Macours | |

(Continued)

FOREIGN PATENT DOCUMENTS

EP 3480809 A1 * 5/2019 ....... G10K 11/17813

OTHER PUBLICATIONS

"Analog and Digital State-Space Adaptive IIR Filters", by David A.Johns, Thesis submitted to the Department of Electrical Engineering, University of Toronto, Mar. 1989, 153 pages.

(Continued)

*Primary Examiner* — Carolyn R Edwards
*Assistant Examiner* — Friedrich Fahnert
(74) *Attorney, Agent, or Firm* — SCULLY, SCOTT, MURPHY & PRESSER, P.C.

(57) ABSTRACT

A computer-implemented method of automated filter design comprising designing a feedback filter for an active noise cancelling system.

17 Claims, 12 Drawing Sheets

(56) References Cited

U.S. PATENT DOCUMENTS

| | | | | |
|---|---|---|---|---|
| 2011/0007907 | A1* | 1/2011 | Park | G10K 11/17855 381/71.8 |
| 2012/0170766 | A1 | 7/2012 | Alves et al. | |
| 2012/0250873 | A1 | 10/2012 | Bakalos et al. | |
| 2014/0126734 | A1 | 5/2014 | Gauger, Jr. et al. | |
| 2014/0314245 | A1 | 10/2014 | Asada et al. | |
| 2016/0196819 | A1* | 7/2016 | Wurtz | G10K 11/17854 381/94.3 |
| 2016/0300563 | A1 | 10/2016 | Park | |
| 2017/0125006 | A1 | 5/2017 | Dzhigan et al. | |
| 2021/0082387 | A1 | 3/2021 | Ku et al. | |
| 2022/0322002 | A1 | 10/2022 | Michael | |

OTHER PUBLICATIONS

"Algorithms for the Constrained Design of Digital Filters with Arbitrary Magnitude and Phase Responses", by Mathias Lang, Dissertation, Jun. 1999, 232 pages.

"Optimal Feedback Control Formulation of the Active Noise Cancellation Problem: Pointwise and Distributed", by Kambiz C. Zangi, Research Laboratory of Electronics Technical Report No. 583, MIT, Cambridge, Massachusetts, May 1994, 158 pages.

"Optimal Design of Digital IIR Filters by Model-Fitting Frequency Response Data", by Arnab K. Shaw, IEEE Transactions on Circuits and Systems—II: Analog and Digital Signal Processing, vol. 42, No. 11, Nov. 1995, pp. 702-710.

"Adaptive Feedback Active Noise Control Headset: Implementation, Evaluation and Its Extension", by Woon S. Gan et al., IEEE Transactions on Consumer Electronics (vol. 51, Issue: 3, Aug. 2005), pp. 975-982.

"Frequency Warping, Basic Concepts, Operators and Transforms", by Unto K. Laine, Found: users.spa.aalto.fi/unski/FreqW.html, pp. 1-4, Frequency_Warping.html, Dec. 12, 2019.

"Direct Design of Parallel Second-Order Filters for Instrument Body Modeling", by Balazs Bank, International Computer Music Conference, Proceedings vol. 1, pp. 458-465, Copenhagen, Denmark, Aug. 2007.

"$H_2/H\infty$ Active Control of Sound in a Headrest: Design and Implementation", by Boaz Rafaely et al., IEEE Transaction on Control Systems Technology, vol. 7, No. 1, Jan. 1999, pp. 79-84.

"Improved Pole Positioning for Parallel Filters Based on Spectral Smoothing and Multi-Band Warping", by Balazs Bank et al., IEEE Signal Processing Letters, vol. 18, No. 5, May 2011, pp. 299-302.

"On $H\infty$-Optimal Sensitivity Theory for SISO Feedback Systems", by Bruce A Francis et al., IEEE Transactions on Automatic Control, vol. AC-29, No. 1, Jan. 1984, pp. 9-16.

"Perceptually Motivated Audio Equalization Using Fixed-Pole Parallel Second-Order Filters", by Balazs Bank, IEEE Signal Processing Letters, vol. 15, May 23, 2008, pp. 477-480.

"Loudspeaker and Room Response Equalization Using Parallel Filters: Comparison of Pole Positioning Strategies", by Balazs Bank, AES, 51st International Conference: Loudspeakers and Headphones, Helsinki, Finland, Aug. 22-24, 2013, pp. 1-10.

"Frequency-Domain Steiglitz-McBride Method for Least-Squares IIR Filter Desig, ARMA Modeling, and Periodogram Smoothing", by Leland B. Jackson, IEEE Signal Processing Letters, vol. 15, Jan. 4, 2008, pp. 49-52.

"Frequency-Warped Signal Processing for Audio Applications", by Aki Harma et al., Journal of Audio Engineering Society, vol. 48, No. 11, Nov. 2000, pp. 1011-1031.

"Measuring Short Impulse Responses With Inverse Filtered Maximum-Length Sequences", by Pedro Cobo et al., Elsevier, Applied Acoustics, vol. 68, Issue 7, Jul. 2007, pp. 820-830.

MATLAB and Simulink Robotics Arena, "Introduction to Filter Design," by Connell D/Souza et al., Mar. 6, 2018, https://www.youtube.com/watch?v=VFt3UVw7VrE.

"An Evolution-Driven Analog Circuit Topology Synthesis" by Ziga Rojec et al., 2016 IEEE Symposium Series on Computational Intelligence (SSCI), Dec. 2016, pp. 1-6, doi: 10.1109/SSCI.2016.7850184.

"Design of an Efficient Active Noise Cancellation Circuit for In-ear Headphones," by Kuan-Hung Chen et al., 2014 IEEE Asia Pacific Conference on Circuits and Systems (APCCAS), Nov. 17-20, 2014, pp. 599-602.

"A Circuit Representation Technique for Automated Circuit Design," by Jason D. Lohn et al., IEEE Transactions on Evolutionary Computation, vol. 3, No. 3, Sep. 1999, pp. 205-219.

Autodesk Library.Io, "Datasheet to model in seconds, Parametric ECAD—MCAD content generation online, the Wayback Machine"—https://web.archive.org/web.20181231233511/https://library.io/ Downloaded: Aug. 3, 2021, 11:18 AM, pp. 1-4.

Non-final Rejection dated Aug. 27, 2020 received in U.S. Appl. No. 16/720,358, 16 pages.

Non-final Rejection dated Dec. 15, 2020 received in U.S. Appl. No. 16/720,358, 13 pages.

Final Rejection dated Apr. 16, 2021 received in U.S. Appl. No. 16/720,358, 13 pages.

Non-final Rejection dated Jul. 22, 2021 received in U.S. Appl. No. 16/720,358, 18 pages.

US Notice of Allowance, U.S. Appl. No. 16/720,358, Applicant: Kontomichos et al., Mail date: Mar. 14, 2022, 7 pages.

"Adapting Hearing Devices to the Individual Ear Acoustics: Database and Target Response Correction Functions for Various Device Styles", by Florian Denk et al., Trends in Hearing, vol. 22: Jan. 19, 2018.

"Equalization filter design for achieving acoustic transparency in a semi-open fit hearing device", by Florian Denk et al., Speech Communication; 13th ITG-Symposium, VDE, 2018.

Non-final Rejection dated Aug. 31, 2022 received in U.S. Appl. No. 17/334,167,23 pages.

"Control Tutorials for MATLAB and Simulink—Introduction: Frequency Domain Methods for Controller Design", webpage accessed Nov. 18, 2022, 11 pages.

"Stability Criteria—(Gain Margin and Phase Margin)", published Sep. 2000, gonzo@mit.edu, URL: https://www.mit.edu/afs.new/athena/course/2/2.010/www_f00/psets/hw3_dir/tutor3_dir/tut3_g.html.

Non-Final Rejection dated May 25, 2023 received in U.S. Appl. No. 17/748,166.

Notice of Allowance dated Feb. 8, 2023 received in U.S. Appl. No. 17/334,167.

* cited by examiner

TOOLS AND METHODS FOR DESIGNING FILTERS FOR USE IN ACTIVE NOISE CANCELLING SYSTEMS

The present disclosure relates to tools and methods for automated filter design. In particular, the present disclosure relates to a method of automatically designing a feedback filter for an active noise cancelling system.

BACKGROUND

Active Noise Cancellation (ANC) enables cancellation of unwanted local environmental acoustic noise, creating the impression of a quiet ambient environment for listeners, whilst optionally leaving desired music/audio signals to be heard without signal degradation. ANC is achieved by producing audio signals with equal amplitudes but opposite phases to the ambient noises at the listeners' ear using the principle of destructive wave interference to cancel unwanted extraneous noise. A typical application field of the ANC operation are the various types of headphones distinguished by the type of fitting on the listener's ear: in-ear, on-ear and over-ear.

In the present disclosure, the terms headphone and headset may be used interchangeably. It will be clear to the skilled person that the present disclosure may be applied to automated filter design for either headphones or headsets.

There are typically two types of ANC: feedback (FB) ANC and feedforward (FF) ANC. A FB ANC system has microphones placed inside the headset in close proximity to the speaker drivers, capturing soundwaves close to the eardrum. FF ANC system microphones are situated externally on the headset, capturing ambient noise before they permeate through the headset to the eardrums. In addition, these two typical designs can be combined to produce a hybrid ANC system which has superior overall performance to either FB or FF ANC systems individual performance.

Several steps are typically followed in order to design an ANC headset. Some of the steps may be summarized as follows:

1. Design and fabricate a headphone enclosure that will facilitate ANC operation.
2. Conduct specific acoustic measurements in order to define the system transfer functions.
3. Utilize the measurements in order to design the filters for achieving the desired ANC performance.
4. Confirm ANC performance after applying the designed filters on the device, with acoustical measurements.

Current practice for designing such FB filters involves specialized software that illustrates magnitude and phase response of the designed filter, open loop response, along with the predicted magnitude response of the ANC performance.

The designer will typically configure a sequence of second order filter stages via selecting filter types (e.g. low pass, shelving, notch etc.); defining their parameters such as cut-off frequency, quality factor etc.; and maximizing the open loop gain to maximize ANC suppression whilst maintaining stability and avoiding undesired increases in noise at any frequency due to constructive interference of ambient noise and the ANC signal.

Manually designed ANC filters introduce the following disadvantages:

1. Optimal filter design is not guaranteed and is very sensitive to subjective judgement and limited to available filter types and total filter order.

2. ANC filter design requires experience and/or training. The learning curve is steep.
3. The procedure can be non-intuitive and complex to the designer and is mainly based on trial and error.
4. The design of a single ANC filter requires a lot of effort (2-3 working days of an experienced design engineer).
5. Multiple filter designs are typically required for a single ANC system, with each filter design requiring 2-3 working days of an experienced design engineer.

SUMMARY

It is desirable to provide an improved method for designing filters for use in active noise cancelling systems.

According to a first aspect of the disclosure there is provided a computer-implemented method of automated filter design comprising designing a feedback filter for an active noise cancelling system.

Optionally, designing the feedback filter comprises determining a filter transfer function of the feedback filter.

Optionally, the filter transfer function is determined using an optimization method.

Optionally, determining the filter transfer function comprises defining a target transfer function of the feedback filter, and applying the optimization method using the target transfer function to determine a filter expression for the filter transfer function.

Optionally, the optimization method is a least square method.

Optionally, the least square method is a weighted least square method.

Optionally, determining the filter transfer function comprises defining an error function that is dependent on an open loop design target and the target transfer function, the open loop design target being dependent on the filter transfer function; and applying the least square method using the error function to determine the filter expression for the filter transfer function that either i) reduces the error function to a sufficiently small value that is indicative of the open loop design target being sufficiently close to the target transfer function, and/or ii) minimizes the error function.

Optionally, the open loop design target is dependent on a feedback path transfer function, being representative of the feedback from a driver to a feedback microphone.

Optionally, the open loop design target is the product of the feedback path transfer function and the filter transfer function.

Optionally, the error function is dependent on the difference between the open loop design target and the target transfer function.

Optionally, the least square method is a weighted least square method such that the error function is dependent on a weighting vector.

Optionally, the error function is approximately equal to the magnitude squared of a first expression, the first expression being equal to the square root of the weighting vector multiplied by the difference between the open loop design target and the target transfer function.

Optionally, the weighting vector is multiplied by a weighting factor.

Optionally, the method comprises a) updating the weighting factor thereby updating the error function, b) applying the least squares method using the error function to determine an alternative expression for the filter transfer function that either i) reduces the error function to a sufficiently small value that is indicative of the open loop design target being sufficiently close to the target transfer function, and/or ii)

minimizes the error function, c) updating the filter expression to the alternative expression if the error function after updating is smaller than the error function prior to updating, and d) repeating steps a) to c) until a number of repetitions of the steps a) to c) exceed a limit, and/or the error function is less than a threshold value.

Optionally, the weighting vector is multiplied by the weighting factor in a frequency range having a minimum frequency and a maximum frequency.

Optionally, the weighting vector is proportional to one divided by the magnitude of the target transfer function squared.

Optionally, defining the target transfer function comprises providing a target transfer function comprising a magnitude being greater than 0 dB in a frequency range from 20 Hz to 800 Hz, and/or a magnitude peak in a frequency range from 100 Hz to 200 Hz, and/or a magnitude less than zero at frequencies greater than 800 Hz.

Optionally, the feedback filter is designed within a frequency range having a maximum frequency and a minimum frequency.

Optionally, determining the filter transfer function comprises defining a target transfer function of the feedback filter, determining a filter expression for the open loop design target comprising determining a first filter expression, the first filter expression comprising a first numerator polynomial and a first denominator polynomial, and determining the first filter expression by applying the least square method using the target transfer function to determine the roots of the first denominator polynomial.

Optionally, determination of the roots of the first denominator polynomial is performed in a warped frequency domain.

Optionally, determining the first filter expression comprises applying the least square method using the target transfer function to determine the roots of the first numerator polynomial after the roots of the first denominator polynomial have been determined.

Optionally, the first filter expression is updated using the roots of the first denominator polynomial prior to determination of the roots of the first numerator polynomial.

Optionally, determining the filter expression comprises determining a second filter expression, the second filter expression comprising a second numerator polynomial and a second denominator polynomial, the roots of the second denominator polynomial being equal to the roots of the first numerator polynomial, and determining the second filter expression by applying the least square method using the target transfer function to determine the roots of the second numerator polynomial.

Optionally, determining the filter expression comprises evaluating which of the first filter expression and the inverse of the second filter expression best meets a design specification, setting the filter expression as the one of the first filter expression and the inverse of the second filter expression that best meet the design specification.

Optionally, the at least one design specification comprises one or more of adaptive noise cancelling performance, attenuation gain, and/or overshoot characteristics.

Optionally, the method comprises designing a feedforward filter for the active noise cancelling system.

According to a second aspect of the disclosure there is provided a computer system comprising a module configured as an automated filter design tool configured to design a feedback filter for an active noise cancelling system.

Optionally, the module configured as the automated filter design tool configured to design a feedforward filter for the active noise cancelling system.

It will be appreciated that the computer system of the second aspect may include providing and/or using features set out in the first aspect and can incorporate other features as described herein.

According to a third aspect of the disclosure there is provided an active noise cancelling system comprising a feedback filter being designed using a method of automated filter design comprising designing the feedback filter.

Optionally, the active noise cancelling system comprises a feedforward filter being designed using a method of automated filter design comprising designing the feedforward filter.

It will be appreciated that the active noise cancelling system of the third aspect may include providing and/or using features set out in the first aspect and/or the second aspect and can incorporate other features as described herein.

BRIEF DESCRIPTION OF THE DRAWINGS

The disclosure is described in further detail below by way of example and with reference to the accompanying drawings, in which.

DETAILED DESCRIPTION

Figure 1:
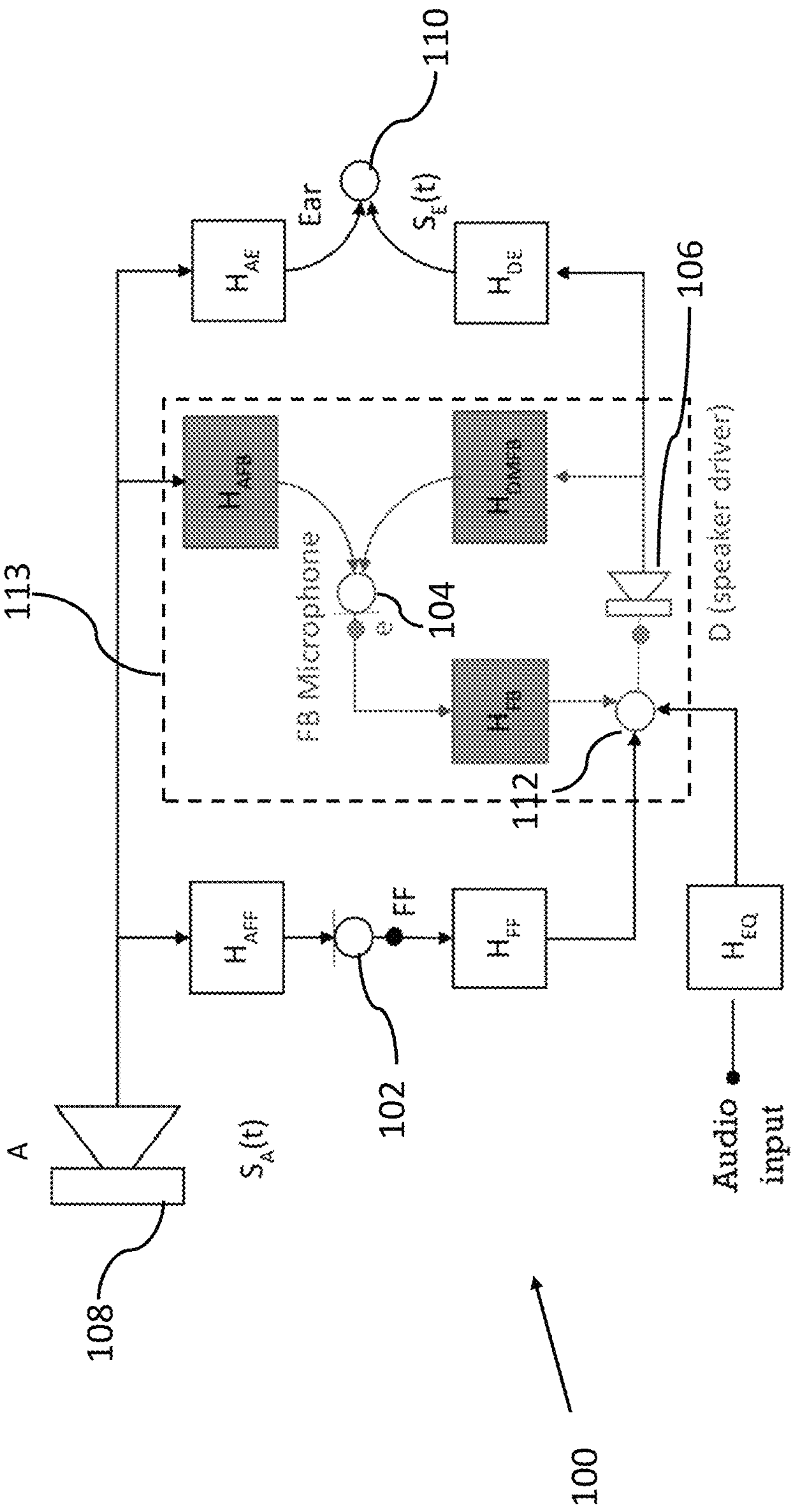
FIG. 1 is a schematic of a hybrid active noise cancelling (ANC) headset.

FIG. 1 is a schematic of a hybrid active noise cancelling (ANC) headset 100. The ANC headset 100 comprises a feedforward microphone 102, a feedback microphone 104 and a speaker driver 106, in addition to a summing circuit 112. In operation an ambient noise source 108 provides ambient noise that is detected by a user's ear 110. The speaker driver 106 generates the appropriate signal at its output to cancel the ambient noise received at the user's ear 110, such that reduced ambient noise is heard by the user. $H_{AFF}$, $H_{FF}$, $H_{FB}$, $H_{DMFB}$, $H_{DE}$, $H_{AE}$, $H_{AFB}$ and, $H_{EQ}$ are transfer functions that are representative of the gain and phase characteristics of their respective signal paths.

A feedback section 113 comprises the feedback microphone 104, the speaker driver 106 and the transfer functions $H_{AFB}$, $H_{FB}$, $H_{DMFB}$.

The speaker driver 106 and the ambient noise source represent two inputs to the ANC system, with a signal D representing an input signal at the speaker driver 106 and a signal A representing an input signal provided by the ambient noise source 108.

The aim of an ANC system providing feedback ANC is to provide a filter $H_{FB}$ such as to cancel $A \cdot H_{AFB}$ at the feedback microphone 104 and the ear 110 by means of destructive interference.

The present disclosure relates to methods and tools for designing a feedback filter for an ANC system. It will be appreciated that the ANC system as shown in FIG. 1 is a hybrid ANC system 100 that includes both a feedback filter and a feedforward filter, and that the methods of the present disclosure may also be applied to a system that provides feedback ANC and not feedforward ANC.

Figure 2B:
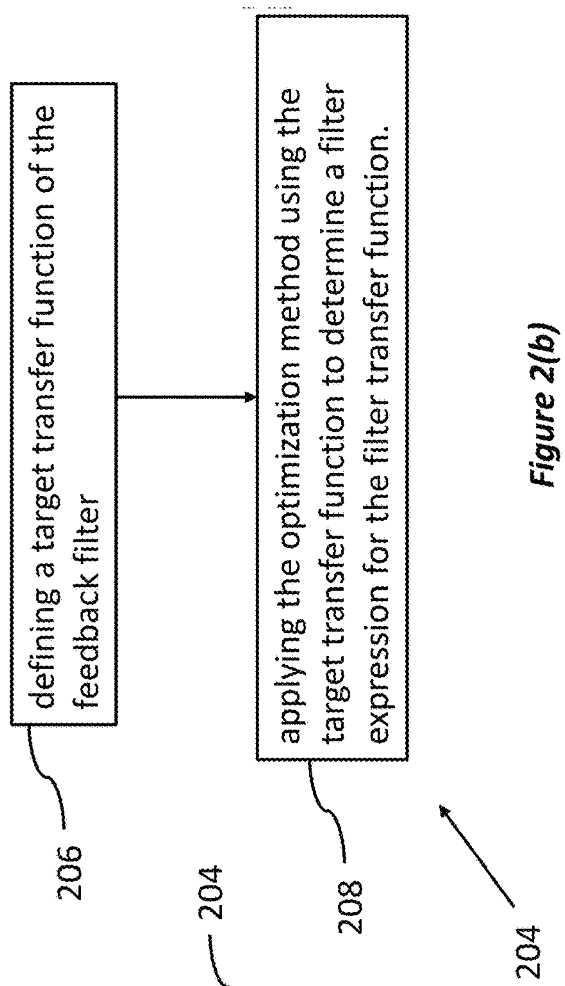
FIG. 2(*a*) is a flow chart of a computer-implemented method of automated filter design in accordance with a first embodiment of the present disclosure, FIG. 2(*b*) is a flow chart of a specific embodiment of determining the filter transfer function, in accordance with a second embodiment of the present disclosure, FIG. 2(*c*) is a flow chart of a specific embodiment of determining the filter transfer function comprising defining an error function.
Figure 2A:
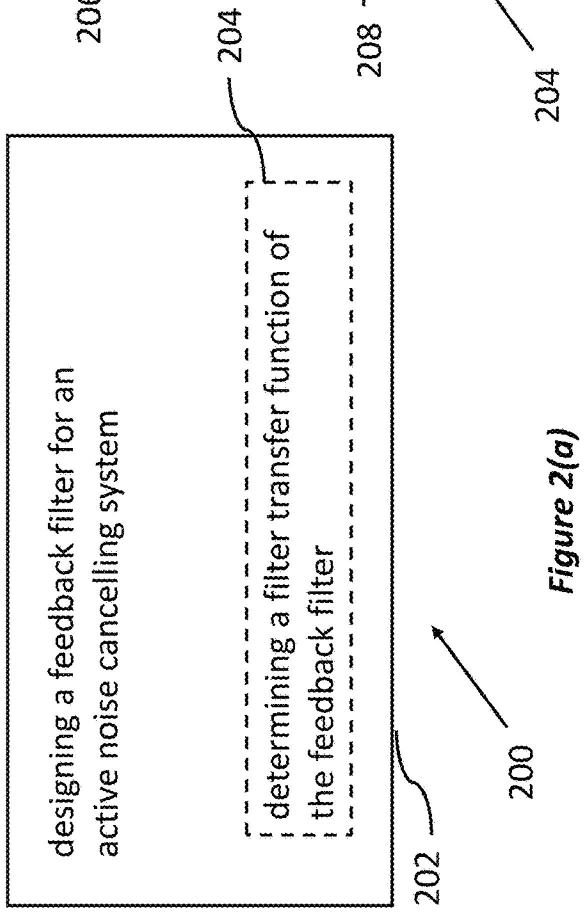
Figure 2C:
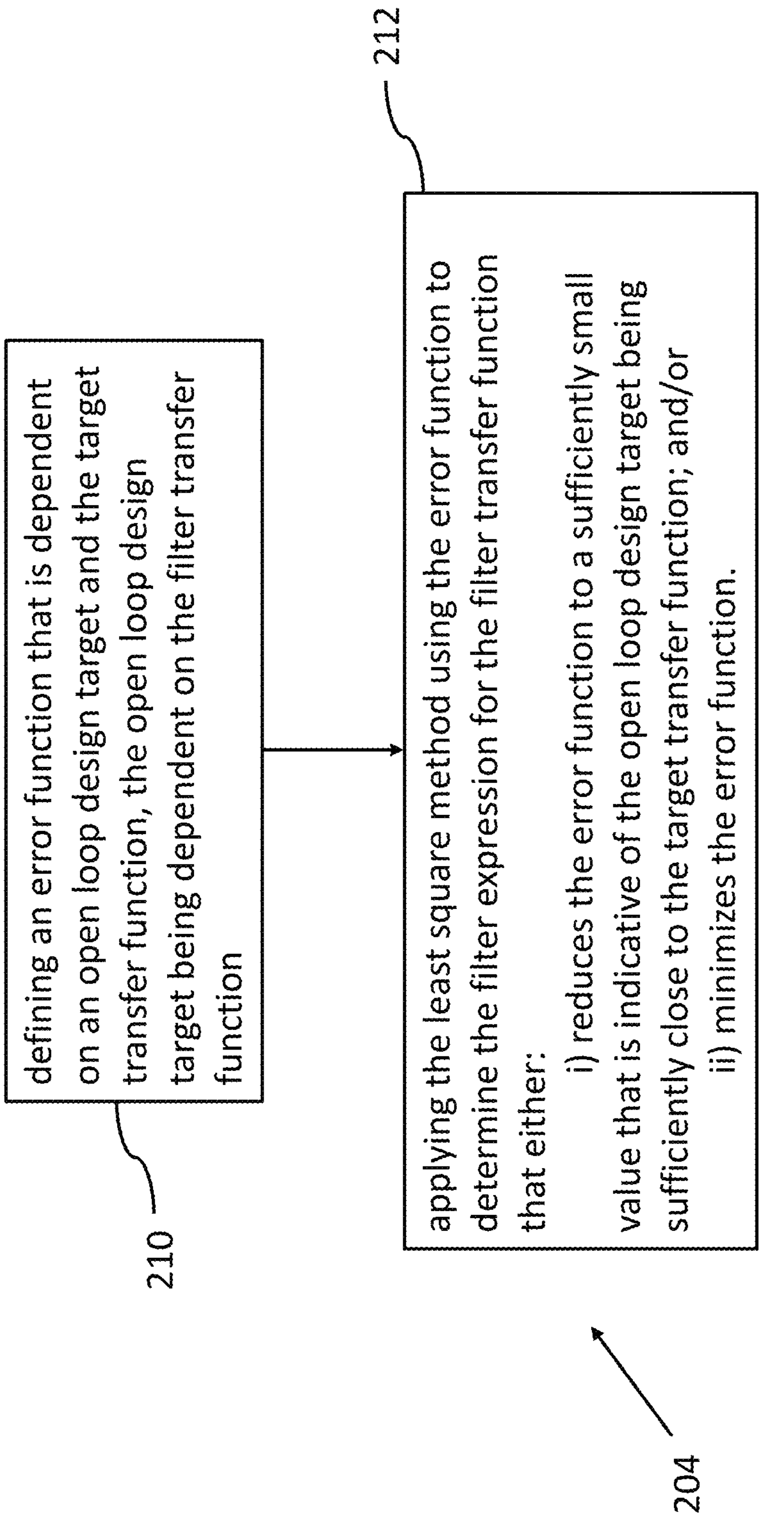

FIG. 2(*a*) is a flow chart of a computer-implemented method 200 of automated filter design comprising designing a feedback filter for an ANC system, at a step 202, in accordance with a first embodiment of the present disclosure.

In a specific embodiment, designing the feedback filter may comprise determining a filter transfer function $H_{FB}$ of the feedback filter, at a step 204. The filter transfer function $H_{FB}$ may be determined using an optimisation method.

FIG. 2(*b*) is a flow chart of a specific embodiment of determining the filter transfer function $H_{FB}$, in accordance with a second embodiment of the present disclosure.

In the present embodiment, determining the filter transfer function $H_{FB}$ comprises defining a target transfer function $H_T$ of the feedback filter at a step 206 and applying the optimization method using the target transfer function $H_T$ to determine a filter expression for the filter transfer function $H_{FB}$, at a step 208.

In a specific embodiment, the optimization method may be a least square method, which may, for example, be a weighted least square method.

FIG. 2(*c*) is a flow chart of a specific embodiment of determining the filter transfer function $H_{FB}$ comprising defining an error function Err that is dependent on an open loop design target $H_{OL}$ and the target transfer function $H_T$, at a step 210. The open loop design target $H_{OL}$ is dependent on the filter transfer function $H_{FB}$, Determining the filter transfer function $H_{FB}$ further comprises applying the least square method using the error function Err to determine the filter expression for the filter transfer function $H_{FB}$ that either reduces the error function Err to a sufficiently small value that is indicative of the open loop design target $H_{OL}$ being sufficiently close to the target transfer function $H_T$ and/or minimizes the error function Err, at a step 212.

In a specific embodiment, the open loop design target $H_{OL}$ may be dependent on a feedback path transfer function $H_{DMFB}$. The feedback path transfer function $H_{DMFB}$ is representative of the feedback from the driver 106 to the feedback microphone 104.

The open loop design target $H_{OL}$ may be the product of the filter transfer function $H_{FB}$ and the feedback path transfer function $H_{DMFB}$, which may be represented as follows:

$$H_{OL}=H_{FB} \cdot H_{DMFB} \tag{1}$$

The open loop response, as provide by the open loop design target $H_{OL}$ may be used to determine closed loop stability by determining gain and phase margin.

The target transfer function $H_T$ represents the gain and phase characteristics of the feedback microphone 104 in an idealised ANC system that would provide optimum noise cancellation characteristics. To provide this optimum functionality, it is necessary to determine the filter expression for the filter transfer function $H_{FB}$ that provides an open loop design target $H_{OL}$ that matches, or is sufficiently close to, the gain and phase change characteristics represented by the target transfer function $H_T$.

It will be appreciated that any determination of $H_{OL}$ as described herein may be used to determine a suitable transfer function $H_{FB}$ for the feedback filter in accordance with the understanding of the skilled person and, for example, using the relation described by equation (1).

The target transfer function $H_T$ may not be a system measured response but a transfer function derived for optimal FB ANC performance.

The filter expression for the filter transfer function $H_{FB}$ that is derived will be achievable using physical circuit components and parameters, such that the designed feedback filter can be implemented using these circuit components and parameters to provide the optimal ANC functionality that is represented by the target transfer function $H_T$.

The filter expression of the filter transfer function $H_{FB}$ is a mathematical expression and may be a polynomial, where the coefficients of the filter expression can be written in corresponding registers of an integrated circuit (IC) implementing digital signal processing (DSP) for ANC.

The filter expression of the filter transfer function $H_{FB}$ may be described by a fraction having a numerator polynomial and a denominator polynomial. The highest order of the two polynomials determines the filter order.

A polynomial of Nth order is determined by N+1 coefficients. For example, a 2nd order IIR filter may be expressed by the expression:

$$\frac{b_0 + b_1 z^{-1} + b_2 z^{-2}}{1 + a_1 z^{-1} + a_2 z^{-2}} \tag{2}$$

A detailed and complicated frequency response requires a very high filter order for its polynomial representation. Poles are the roots of the denominator polynomial and zeros are the roots of the numerator polynomial. Also, it is possible to calculate coefficients from given poles and vice versa from standard equations.

The error function Err is a measure of how close the open loop design target $H_{OL}$ matches the target transfer function $H_T$. It is desirable for the open loop design target $H_{OL}$ to match the target transfer function $H_T$ exactly, which would yield an error function Err equal to zero.

However, in a practical implementation that uses physically implementable circuits and parameters, it is not feasible to match the open loop design target $H_{OL}$ exactly to the target transfer function $H_T$.

As such, it is desirable that the error function Err is of a sufficiently small value that is indicative of the filter transfer function $H_{FB}$ providing the necessary functionality within an application-dependent tolerance range.

For example, in an ANC system, it will be less relevant to provide optimal noise cancelling outside the range of human hearing, and the system may compromise in this area. Preferably, the error function Err is minimised.

The error function Err may be dependent on the difference between the open loop design target $H_{OL}$ and the target transfer function $H_T$, for example as follows:

$$Err = |H_{OL} - H_T|^2 = \left|H_{FB} - \frac{H_T}{H_{DMFB}}\right|^2 \tag{3}$$

In a further embodiment, the least square method may be a weighted least square method such that the error function Err is dependent on a weighting vector W, as follows:

$$Err = \left|\sqrt{W}\,(H_{OL} - H_T)\right|^2 \tag{4}$$

As shown in equation (4) the error function Err in the present embodiment is equal to the magnitude squared of a first expression, given by the square root of the weighting vector W, multiplied by the difference between the open loop design target $H_{OL}$ and the target transfer function $H_T$.

The weighting vector W is preferably a vector with appropriate weight values to minimise errors between the target transfer function $H_T$ and the open loop design target $H_{OL}$ in specific frequency ranges. For example, for high performance ANC, it may be essential that the target transfer function $H_T$ and the open loop design target $H_{OL}$ match very closely over a first frequency range, whilst the transfer functions $H_T$, $H_{OL}$ can differ largely over a second frequency range. The weighting vector W can be used to weight the importance of the matching of the transfer functions $H_{OL}$, $H_T$ over the different frequency ranges, which can simplify and/or speed up the design process.

The weighting vector W may have two functions, namely: reducing the distance, represented by the value of the error function Err, between $H_{OL}$ and $H_T$ in the ANC range (the first frequency range) and increasing the distance elsewhere (the second frequency range). The increase in the error function Err value in the second frequency range is necessary for reducing overshoots.

Step 3 of designing an ANC headset, as described previously is as follows: Utilize the measurements in order to design the filters for achieving the desired ANC performance. Methods of the present disclosure may be applied to facilitate the 3rd step for a FB filter design.

As described previously, the aim of an ANC system providing feedback ANC is to provide a filter $H_{FB}$ such as to cancel $A \cdot H_{AFB}$ at the feedback microphone 104 and the ear 110 by means of destructive interference. In an ideal system, the error signal, e, as shown in FIG. 1 would be zero.

In a physical system, this is not practically possible as there are electrical, mechanical and acoustic delays in the feedback section 113, which make it impossible to perfectly cancel all of the ambient noise signal. The impact of these delays is denoted by the feedback path transfer function $H_{DMFB}$, which denotes the feedback from the driver 106 to the microphone 104.

Each feedback ANC headset may comprise electro-acoustic components such as the speaker 106 and the FB microphone 104, in addition to mechanical components like a cushion and a speaker cavity. Collectively, these components determine the gain and phase response of a headset. The feedback path transfer function $H_{DMFB}$ describes the gain and phase response of the headset and may be modelled as shown in FIG. 1.

The feedback path transfer function $H_{DMFB}$ may, for example, be determined by acoustic measurement of a representative ANC system or may be determined by modelling/simulation a representative ANC system.

Different headsets will typically have different gain and phase responses, therefore characterization to optimize each headset in terms of FB ANC performance may be used to achieve a maximum bandwidth.

The output of the microphone feedback cancellation signal is passed through the feedback filter $H_{FB}$. Therefore, the active feedback component of an ANC system can be described as:

$$FBANC = \frac{e}{A \cdot H_{AFB}} \tag{5}$$

FBANC is a measure of feedback ANC performance of the ANC system. As it is desirable to minimise the error signal e, it is desirable for FBANC to tend to zero.

The error signal, e, that is picked up by the FB microphone 104 is the error signal resulting from the feedback loop signal, e. $H_{FB} \cdot H_{DMFB}$, being added acoustically to the ambient noise, $A \cdot H_{AFB}$. The aim is to design the filter $H_{FB}$ such as to maximise the ANC suppression while maintaining enough open loop gain and phase margin to ensure stability. This may be represented by the following:

$$e = A \cdot H_{AFB} + e \cdot H_{FB} \cdot H_{DMFB} \tag{6}$$

Note we are using the convention of adding the two acoustic signals A. $H_{AFB}$ and e. $H_{FB} \cdot H_{DMFB}$ in space (air) as opposed to subtracting the two signals as in traditional closed feedback loop performance definition.

This leads us to define the feedback ANC performance as:

$$FB\ ANC = \frac{e}{A \cdot H_{AFB}} = \frac{1}{1 - H_{FB} \cdot H_{DMFB}} \tag{7}$$

Embodiments of the present disclosure provide methods to calculate an optimal feedback filter transfer function $H_{FB}$ coefficients for optimizing the ANC performance in the feedback path 113 in FIG. 1 and as described in equation (7).

The automatic FB ANC filter design algorithms of the present disclosure may be implemented for utilization in ANC headset design. The algorithm may take into account specific acoustic measurements in order to approximate a filter that better produces an anti-noise signal from the headset speaker 106 to the FB Microphone 104 and ear 110.

U.S. Ser. No. 11/404,040B1 relates to automated feedforward filter design. For automated feedback filter design as described herein, and unlike in automated feedforward filter design, there is no direct target for designing the filter However, by utilising the fact that the open loop filter response, $H_{FB}$. $H_{DMFB}$, directly dictates the closed loop performance (equation (7)), this can be used in conjunction with gain and phase margin stability criteria to form an open loop design target $H_{OL}$. As discussed previously, the open loop design target be given by equation (1).

The magnitude response of the open loop design target $H_{OL}$ may be adapted to improve the algorithm performance. The open loop design target $H_{OL}$ may be limited by the characteristics of $H_{DMFB}$.

Equation (4) may be rewritten as follows:

$$e = \left|\sqrt{W}\,(H_{FB} \cdot H_{DMFB} - H_T)\right|^2 \tag{8}$$

where, the error signal e may be the error function Err, as described previously.

In order to achieve the approximation of the target $H_T$, embodiments of the present disclosure may use the weighted least square approximation, as discussed previously. In this sense, the algorithm will minimize the error e provided by equation (8).

In a specific embodiment of the present disclosure, the weighting vector W may be multiplied by a weighting factor.

The method may further comprise a first step of updating the weighting factor thereby updating the error function Err, a second step of applying the least squares method, for example, provided by equation (4) using the error function Err to determine an alternative expression for the filter transfer function $H_{FB}$ that either:

reduces the error function Err to a sufficiently small value that is indicative of the open loop design target $H_{OL}$ being sufficiently close to the target transfer function $H_T$ and/or minimizes the error function Err The method then further comprises a third step of updating the filter expression to the alternative expression if the error function Err after updating is smaller than the error function Err prior to updating and repeating steps one to three until a number of repetitions of the steps exceeds a limit and/or the error function Err is less than a threshold value.

The weighting vector W may be multiplied by the weighting factor in a frequency range having a minimum frequency and a maximum frequency. In a specific embodiment the weighting vector W may be proportional to one divided by the magnitude of the target transfer function $H_T$ squared as follows:

$$W \propto \frac{1}{|H_T|^2} \tag{9}$$

In a specific embodiment, the feedback filter may be designed within a frequency range having a maximum frequency and a minimum frequency.

A designer undertaking the steps of embodiments of the methods disclosed herein may set the minimum and maximum desired ANC frequency range in Hz ($f_{min}$ and $f_{max}$). An ideal feedback open loop magnitude response curve may be determined within the designer designed frequency range to provide the target transfer function $H_T$. Following this step, the weighting vector may be determined as follows:

$$W = f\left(\frac{1}{|H_T|^2}\right) \tag{10}$$

where f is a frequency within the range as previously described: $f_{min} \le f \le f_{max}$.

Computing of the weighting vector using equation (10) may be used to minimise overshoots in the ANC performance.

The least square approximation accuracy may be increased by multiplying W in the range $f_{min} \le f \le f_{max}$ with a weight factor, as discussed previously. This provides a user-defined weighting which can be used to add emphasis or "weight" to the least square approximation in a particular frequency region, e.g. if targeting maximum suppression at 200 Hz the weighting factor at 200 Hz could be increased (the weighting factor will bias the least square calculation to minimise error in the range with largest weight).

The calculation can iterate the values of W in the range of $w_{min} \le W \le w_{max}$ seeking the value that provides best performance combined with low overshoot level. It will be appreciated that the use of the weight factor can be omitted at the expense of performance.

In a specific embodiment, within each iteration step, the calculation filter performance is calculated and if the filter matches the criteria set by the user and/or is better performing than a previously calculated filter, it updates the best filter solution.

In specific embodiments of the methods disclosed herein, the FB filter design algorithm not only designs the FB filter to best match the open loop target magnitude $H_T$ using a least squares (LS) approach, it also enables precise control of gain margin, phase margin and overshoot level. This ensures precise control of stability margins which facilitate stable performance when worn/tested with different listeners/users. It is possible to set the range, lower and upper frequency limits, of optimisation ensuring best performance in the desired frequency region.

However, this may not be possible to over the whole audible frequency range (20 Hz-20 kHz) due to the inherent latency of the open loop. Therefore, the least square approximation method could be supported with features (methods) that allow the calculated filter frequency response to achieve both the error minimization in the desired frequency range and obtain specific characteristics in order to minimize overshoot level outside of it. This may be achieved, for example, by using the weighting vector as discussed herein.

In summary, the use of a weighting vector W can improve stability of the ANC performance of the designed feedback filter. The weighted accuracy/bias for least square component within user defined desired frequency range can provide minimization of the least square approximation error, which corresponds to matching of the desired open loop target response $H_T$ with calculated open loop response $H_{OL}$ using newly designed feedback filter.

In a specific embodiment of the present disclosure determining the filter transfer function (for example as shown by step 204 of FIG. 2(*a*)), comprises defining the target transfer function $H_T$ of the feedback filter and determining a filter expression for the open loop design target $H_{OL}$ comprising determining a first filter expression, the first filter expression comprising a first numerator polynomial and a first denominator polynomial and determining the first filter expression by applying the least square method using the target transfer function $H_T$ to determine the roots of the first denominator polynomial. Equation (2) as previously discussed is an example of an expression having a numerator polynomial and a denominator polynomial. Determination of the roots of the first denominator polynomial may be performed in a warped frequency domain to, for example, warp the frequency axis prior to optimisation.

There may be provided an initial estimate of filter pole positioning, for example, by splitting the poles in two groups, namely higher and lower frequency regions. This may be performed using the least square method in the warped frequency domain using different warping parameters for lower and higher frequencies. The low frequency range may align with the ANC operation frequency range and the high frequency range may align with a frequency range over which overshoots are expected to occur.

Initial estimation of filter pole positioning using logarithmic separation in the area where ANC is desired/possible. This approach provides optimized pole positioning allowing the least square approximation to calculate a transfer function that better matches defined open loop target response in the desired frequency range specified by the user.

The warped frequency domain is a way to affect the spectral density of (change the resolution of) the frequency response points with a different factor in different ranges. This can yield different importance for the least square method in two ranges: the range with large compression will lead to less detail (higher error) in the least square method. This technique may imitate the human ear resolution.

Determining the first filter expression may comprise applying the least square method using the target transfer function $H_T$ to determine the roots of the first numerator polynomial after the roots of the first denominator polynomial have been determined. The first filter expression may be updated using the roots of the first denominator polynomial prior to determination of the roots of the first numerator polynomial.

The pole positions may be split into one or more frequency ranges, for example, for a single frequency range $f_{low} \leq f \leq f_{high}$. $f_{low}$ is the lowest frequency in the range and $f_{last}$ is the maximum frequency that Least Square operation will take into account.

In a further embodiment, the pole positions may be split into two frequency ranges as follows:

$$1 \leq f \leq f_c \tag{11}$$

$$f_c \leq f \leq f_{last} \tag{12}$$

where $f_c$ is a central frequency that divides the two ranges, $f_{last}$ is a maximum frequency that the least square method will take into account and f is a frequency.

The number of poles depends on the order of the feedback filter, which may be a user-defined parameter. Preferably, the number of poles in the ranges defined by equations (11) and (12) should total the feedback filter order.

The number of poles in each of the ranges defined by equations (11) and (12) can be user defined or iterated by seeking the solution that gives the best results. This step may be substituted by any suitable method to calculate the initial complex pole values, including a user manual input of a pole set. If the split pole method is used, the following procedure is preferably applied for each frequency range.

The following steps can be applied for each of the frequency ranges to determine the poles (the denominator polynomial of the open loop design target $H_{OL}$):

1. Compute a warped angular frequency ω' using a normalized angular frequency ω via the formula:

$$\omega' = \arctan\frac{(1-\lambda^2)\sin(\omega)}{(1+\lambda)^2\cos(\omega) - 2\lambda} \tag{13}$$

where λ is a variable having a value between zero and one, with a higher value providing a larger spectral density, and $$\omega = \frac{2\pi}{f_s} \tag{14}$$

where $f_s$ is a sampling frequency of the ANC system.

2. Defining $$\frac{H_{OL}}{H_{DMFB}} = \frac{B}{A} \tag{15}$$

where B is the numerator polynomial and A is the denominator polynomial, as previously discussed.

3. Rewriting the error function Err of equation (4) as follows:

$$Err = \sqrt{W}\,|(H_{out}A - BH_{in})|^2 \tag{16}$$

or $$Err = \sqrt{W}\left|\left(H_{out} - \frac{B}{A}H_{in}\right)\right|^2 \tag{17}$$

where $H_{out}$ and $H_{in}$ are as provided by the following:

$$H_{in} = -\text{FBANC}\cdot H_{DMFB} \tag{18}$$

and $$H_{out} = 1 - \text{FBANC}$$

4. Applying the least square method to equations (16) or (17) to determine the roots, for example the complex roots, of the denominator polynomial A as follows:

$$\sqrt{W}\,|(H_{out}A - BH_{in})|^2 \to 0 \tag{20}$$

or $$\sqrt{W}\left|\left(H_{out} - \frac{B}{A}H_{in}\right)\right|^2 \to 0 \tag{21}$$

Rearranging equation (7) in terms of $H_{FB}$ as follows provides the terms shown in equations (18) and (19):

$$H_{FB} = \frac{1 - FBANC}{-FBANC\cdot H_{DMFB}} = \frac{H_{out}}{H_{in}} \tag{22}$$

Once the roots of the A and B polynomials have been determined, it is possible to calculate the filter frequency response of the filter expression having the A and B polynomials using the coefficients of the polynomials. In the present example it is possible to determine the filter frequency response of the first filter expression. The ANC performance may be determined using equation (7).

The roots of a polynomial can be used to determine the coefficients of the polynomial and therefore can be used to determine a suitable filter expression for the open loop design target $H_{OL}$.

Determining the filter expression may further comprise determining a second filter expression. The second filter expression may comprise a second numerator polynomial and a second denominator polynomial. The roots of the second denominator polynomial may be equal to the roots of the first numerator polynomial. Determining the filter expression may further comprise determining the second filter expression by applying the least square method using the target transfer function $H_T$ to determine the roots of the second numerator polynomial.

In summary, the process may be iterated to optimize both the poles and the zeroes of the designed IIR filter. In order to achieve this the steps below should be followed i. Compute the filter frequency response using the coefficients of polynomials B and A.
ii. Compute the ANC performance of the designed filter using formula (7).
iii. If the performance of the filter in current iteration is better than the previous best performing filter according to criteria set by the user such as attenuation, gain margin, phase margin and maximum overshoot limit, set the current filter settings as the best.
iv. Calculate the zeroes of the current iteration as roots of B polynomial.
v. Invert $H_{OL}$ and $H_{out}$ and repeat the process using the zeroes as input for the fixed pole structure.
vi. Repeat the last steps as many times as set by the user.
vii. Return the best performing filter coefficients.

Determining the filter expression may further comprise evaluating which of the first filter expression and the inverse of the second filter expression best meets a design specification and setting the filter expression as the one of the first filter expression and the inverse of the second filter expression that best meet the design specification.

Figure 3:
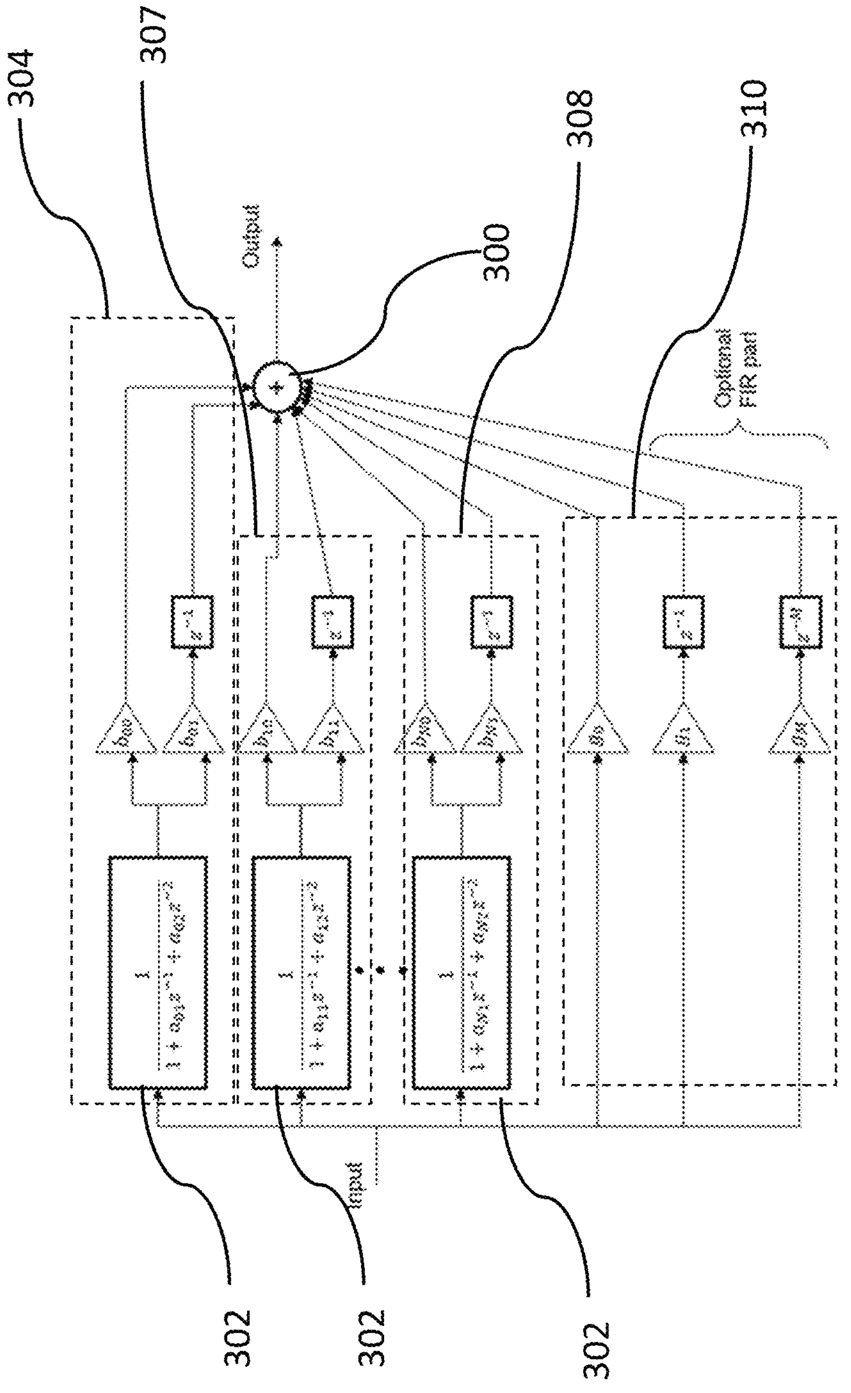
FIG. 3 is a block diagram of the open loop design target.

At least one design specification may comprise one or more of adaptive noise cancelling performance, attenuation gain, and/or overshoot characteristics. FIG. 3 is a block diagram of the open loop design target $H_{OL}$ as determined using the method disclosed herein. The block diagram illustrates how the coefficient approximation accuracy can be enhanced based on splitting the IIR filter transfer function in parallel biquadratic sections with fixed poles.

The open loop design target $H_{OL}$ is broken down into parallel sections. The parallel sections are all added to determine the overall response of the open loop design target $H_{OL}$ at a point 300.

A first series of blocks 302 represents the denominator polynomial determined by the warped frequency method described previously. $b_{00}$ and $b_{01}$ are the coefficients of the numerator polynomial as determined previously and are part of a first section 304. The total number of available sections are related to the overall filter order that is required prior to running this method; an overall filter of Nth order will be broken down to N/2 sections. g0 is a flat gain added to the overall system (numeral 306). If the order is an odd value, a first order section will be introduced.

Additional sections are labelled 307 and 308. $b_{10}$, $b_{11}$ are the coefficients of numerator polynomials of section 307 and $b_{N0}$, $b_{N1}$ are coefficients of the numerator polynomials of section 308. Reference numeral 310 denotes an optional FIR part.

In a preferred embodiment the methods disclosed herein uses parallel structure Second Order Sections (SOS) to enhance accuracy and reduce error. The overall open loop transfer function $H_{OL}$ be derived by adding the individual sections as shown in FIG. 3. The reason to select this particular structure is that it enhances the calculation accuracy and reduces the least mean square error more effectively than the e.g. sequential biquad structure or defining the overall transfer function at once.

It will be appreciated that the parallel SOS can be converted to a sequential SOS (for example if required by the DSP architecture) using standard methodologies as will be clear to the skilled person.

Figure 4B:
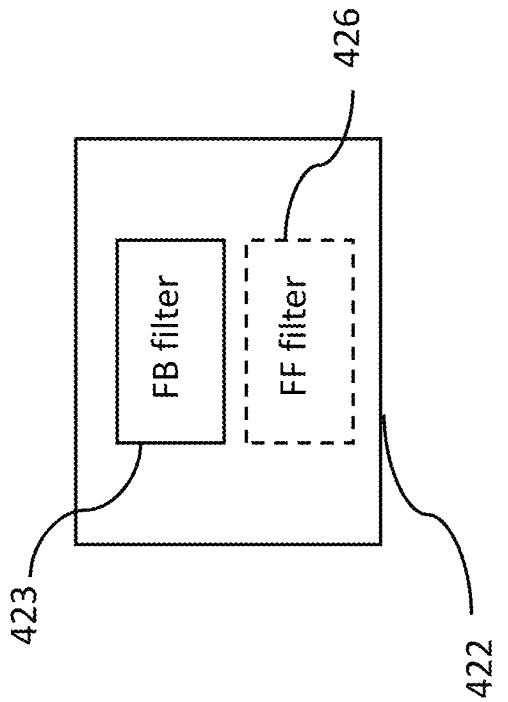
FIG. 4(*a*) is a schematic of a computer system which comprises specially modified components for carrying out the methods as disclosed herein, and in accordance with a third embodiment of the present disclosure, FIG. 4(*b*) is a schematic of an active noise cancelling system comprising a feedback filter, in accordance with a fourth embodiment of the present disclosure.
Figure 4A:
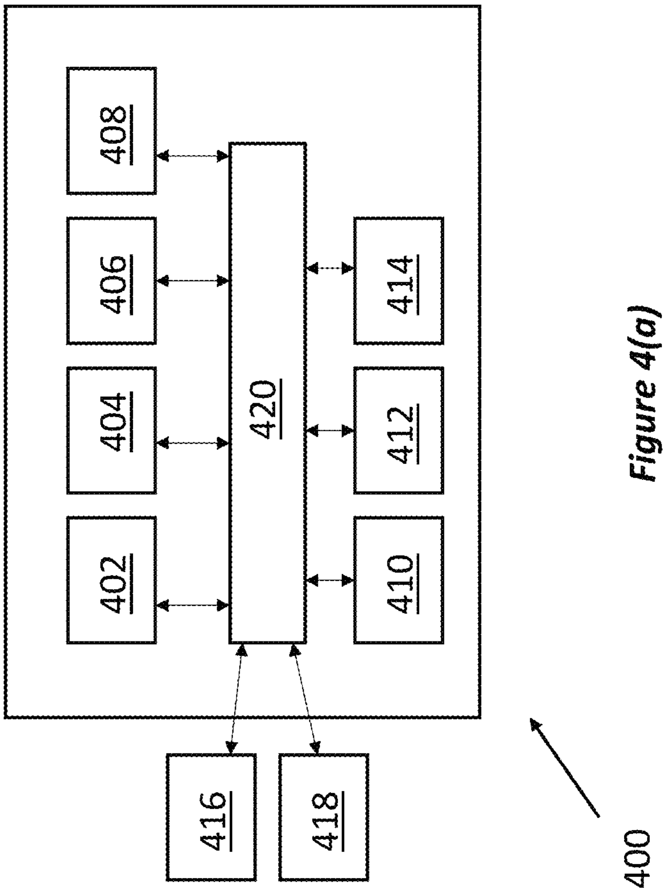

FIG. 4(*a*) is a schematic of a computer system 400 which comprises specially modified components for carrying out the methods as disclosed herein, and in accordance with a third embodiment of the present disclosure. The computer system 300 comprises a module 302 configured as an automated feedback filter design tool configured to design a feedback filter for a system implementing active noise cancelling. The automated feedback filter design tool may be configured to perform the method 200 and any of the specific embodiments as described herein.

The computer system 402 may comprise a processor 404, a storage device 406, RAM 408, ROM 410, a data interface 412, a communications interface 414, a display 416, and an input device 418. The computer system 400 may comprise a bus 420 to enable communication between the different components.

The computer system 400 may be configured to load an application. The instructions provided by the application may be carried out by the processor 404. The application may be the automated feedback filter design tool of the present disclosure.

A user may interact with the computer system 400 using the display 416 and the input device 418 to instruct the computer system 400 to implement the methods of the present disclosure in the automated design of a feedforward filter for an ANC system.

The weighting vector W and the target transfer function $H_T$ may be defined automatically as part of the method 200, or may alternatively be provided as inputs, for example by a user interacting with the computer system 400. Determination of the open loop design target $H_{OL}$ and the filter transfer function $H_{FB}$ of the feedback filter may be automated using the method 200.

FIG. 4(*b*) is a schematic of an active noise cancelling system 422 comprising a feedback filter 423, in accordance with a fourth embodiment of the present disclosure. The feedback filter 423 may be designed using the method 200 and any of the specific embodiments related as described herein, and in accordance with the understanding of the skilled person.

It will be appreciated that the feedback filter 423 may comprise one or more sub-filters.

In a specific embodiment, the active noise cancelling system 422 may comprise a feedforward filter 426 such that the system 422 is a hybrid ANC system.

In a further embodiment, the methods disclosed herein may also comprise designing a feedforward filter for the active noise cancelling system. This may be an automated design method, for example as described in U.S. Ser. No. 11/404,040B1. The feedforward filter of a specific embodiment of the system 422 may be designed using an automated method such as this.

The present disclosure provides methods and tools for fast automated feedback filter design to facilitate digital and/or analogue Active Noise Cancelling (ANC) headphones (both FB-only and hybrid (optionally, in conjunction with FF design)).

Figure 5A:
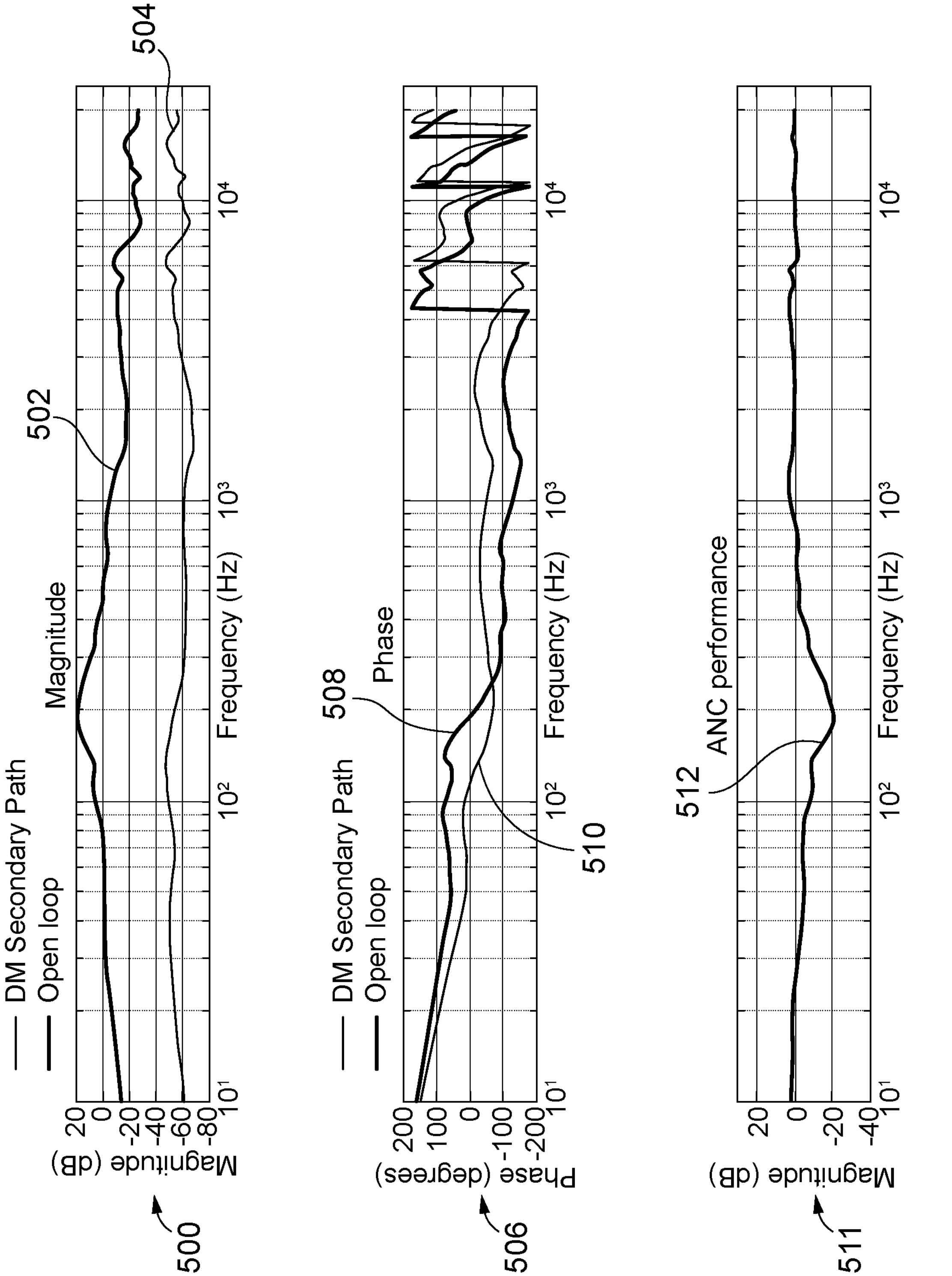
FIG. 5(*a*) shows simulation results for a practical implementation of the ANC headset, FIG. 5(*b*) shows a magnitude plot for the open loop design target and for the target transfer function.
Figure 5B:
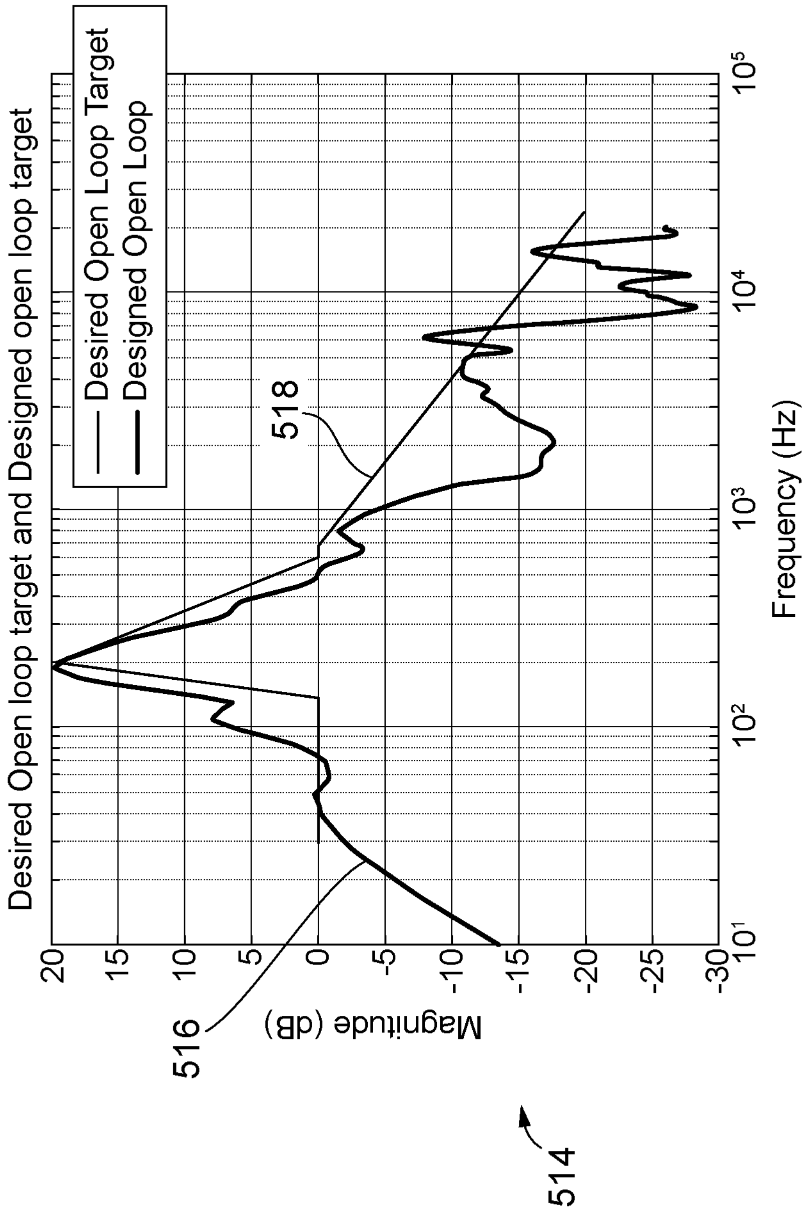

FIG. 5(*a*) shows simulation results for a practical implementation of the ANC headset 100 and includes a magnitude plot 500 for the open loop design target $H_{OL}=H_{FB}\cdot H_{DMFB}$ (reference numeral 502) and for the feedback path transfer function $H_{DMFB}$ (reference numeral 504); a phase plot 506 for the open loop design target $H_{OL}=H_{FB}\cdot H_{DMFB}$ (reference numeral 508) and for the feedback bath transfer function $H_{DMFB}$ (reference numeral 510); and a plot 511 for FBANC as described by equation (7) (reference numeral 512).

FIG. 5(*b*) shows a magnitude plot 514 for the open loop design target $H_{OL}=H_{FB}\cdot H_{DMFB}$ (reference numeral 516) and for the target transfer function $H_T$ (reference numeral 518).

The FIG. 5(*a*) and FIG. 5(*b*) design example shows a headset design with open loop 30° phase margin and 6 db gain margin.

Figure 6A:
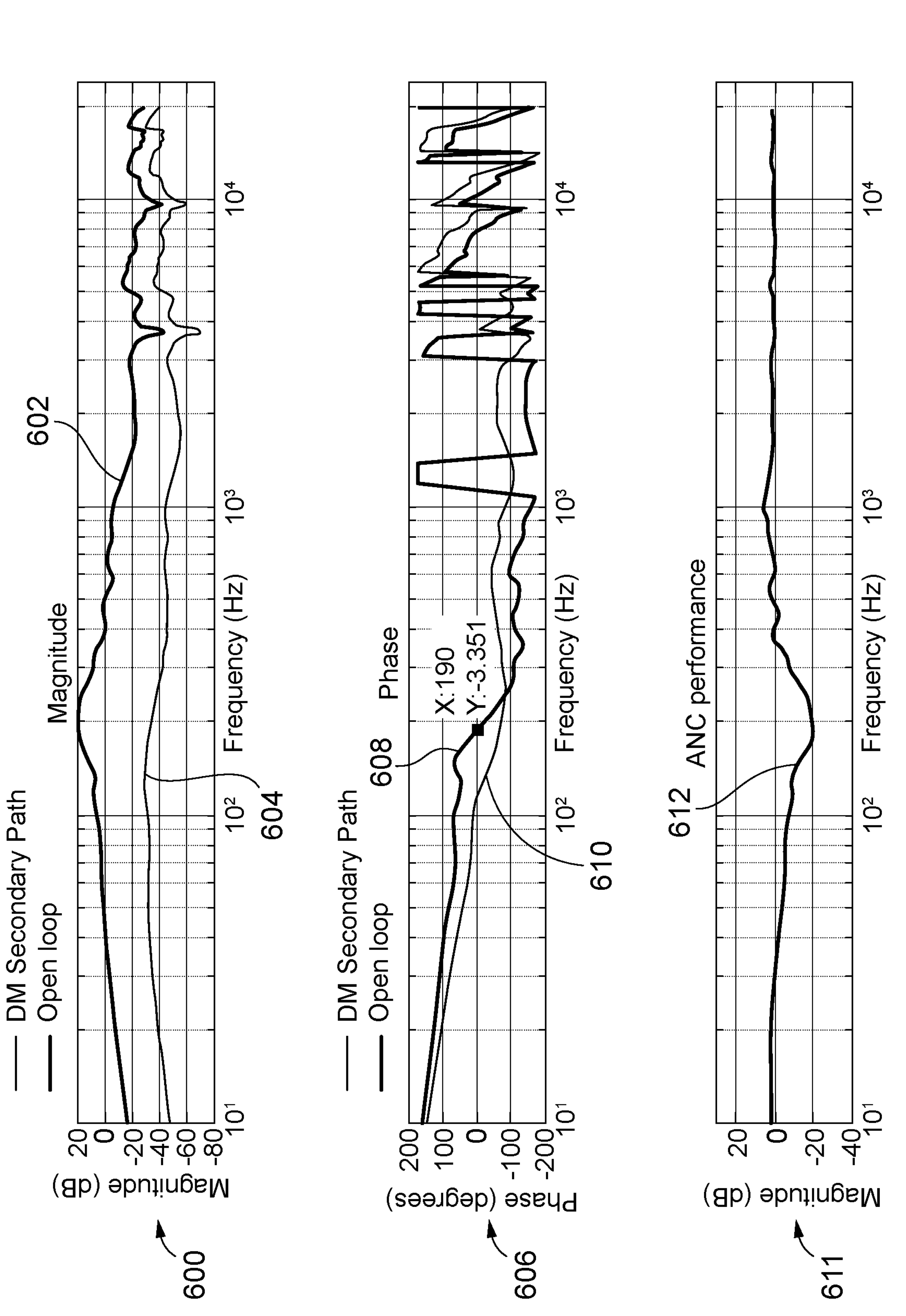
FIG. 6(*a*) shows simulation results for a further practical implementation of the ANC headset, FIG. 6(*b*) shows a magnitude plot for the open loop design target and for the target transfer function.
Figure 6B:
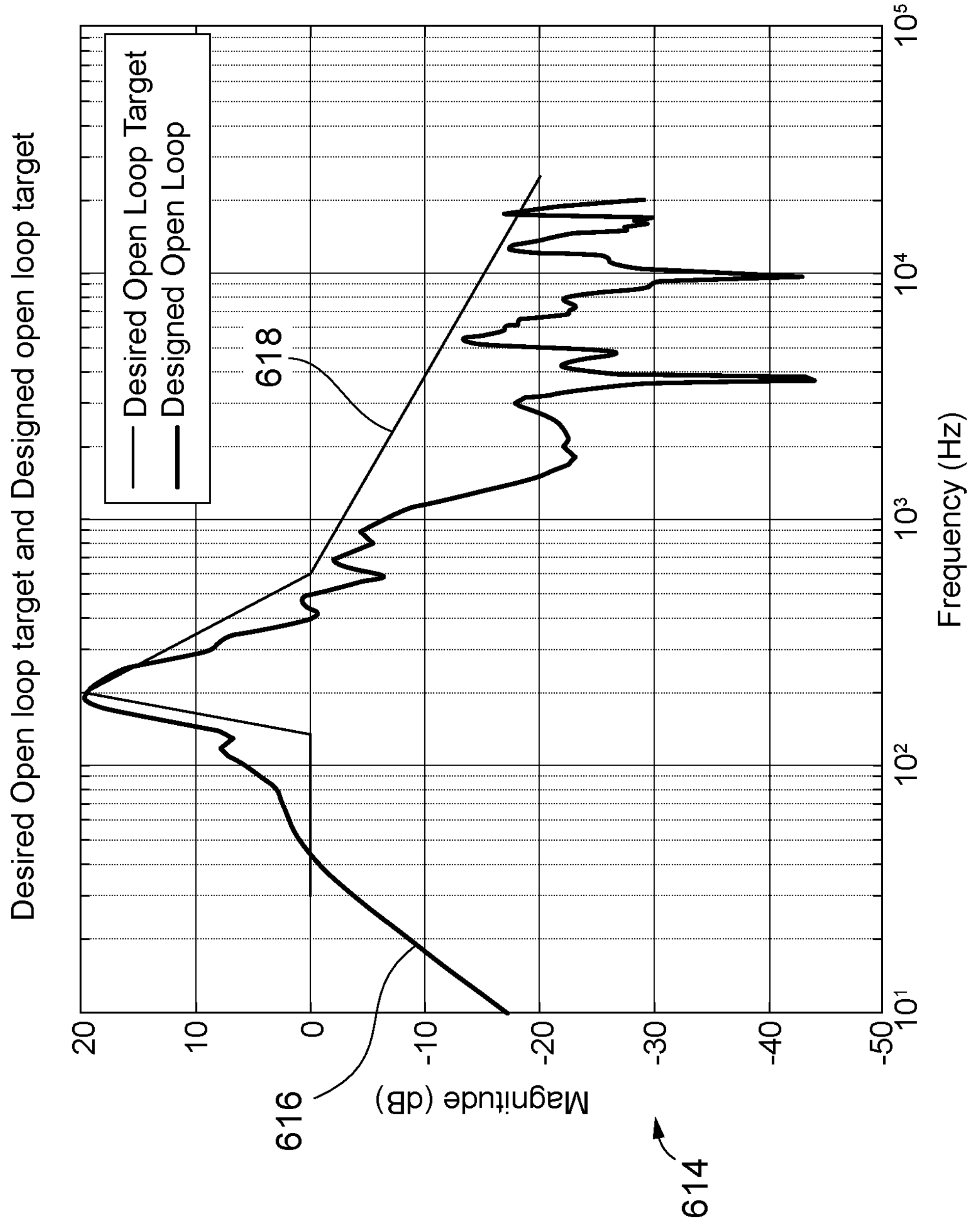

FIG. 6(*a*) shows simulation results for a practical implementation of the ANC headset 100 and includes a magnitude plot 600 for the open loop design target $H_{OL}=H_{FB}\cdot H_{DMFB}$ (reference numeral 602) and for the feedback path transfer function $H_{DMFB}$ (reference numeral 604); a phase plot 606 for the open loop design target $H_{OL}=H_{FB}\cdot H_{DMFB}$ (reference numeral 608) and for the feedback bath transfer function $H_{DMFB}$ (reference numeral 610); and for FBANC as described by equation (7) (reference numeral 612).

FIG. 6(*b*) shows a magnitude plot 614 for the open loop design target $H_{OL}=H_{FB}\cdot H_{DMFB}$ (reference numeral 616) and for the target transfer function $H_T$ (reference numeral 618).

Figure 7A:
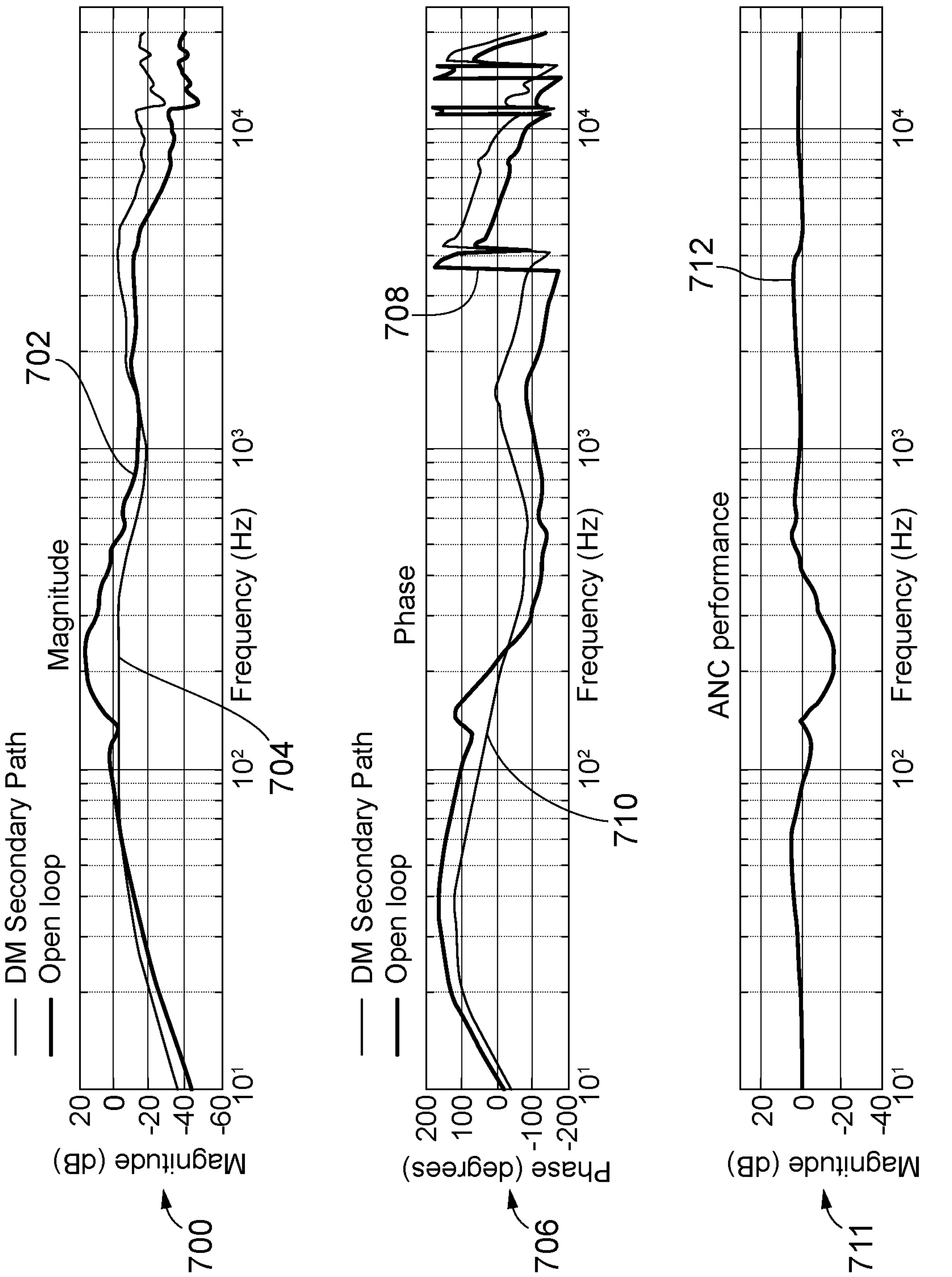
FIG. 7(*a*) shows simulation results for a further practical implementation of the ANC headset, FIG. 7(*b*) shows a magnitude plot for the open loop design target and for the target transfer function.
Figure 7B:
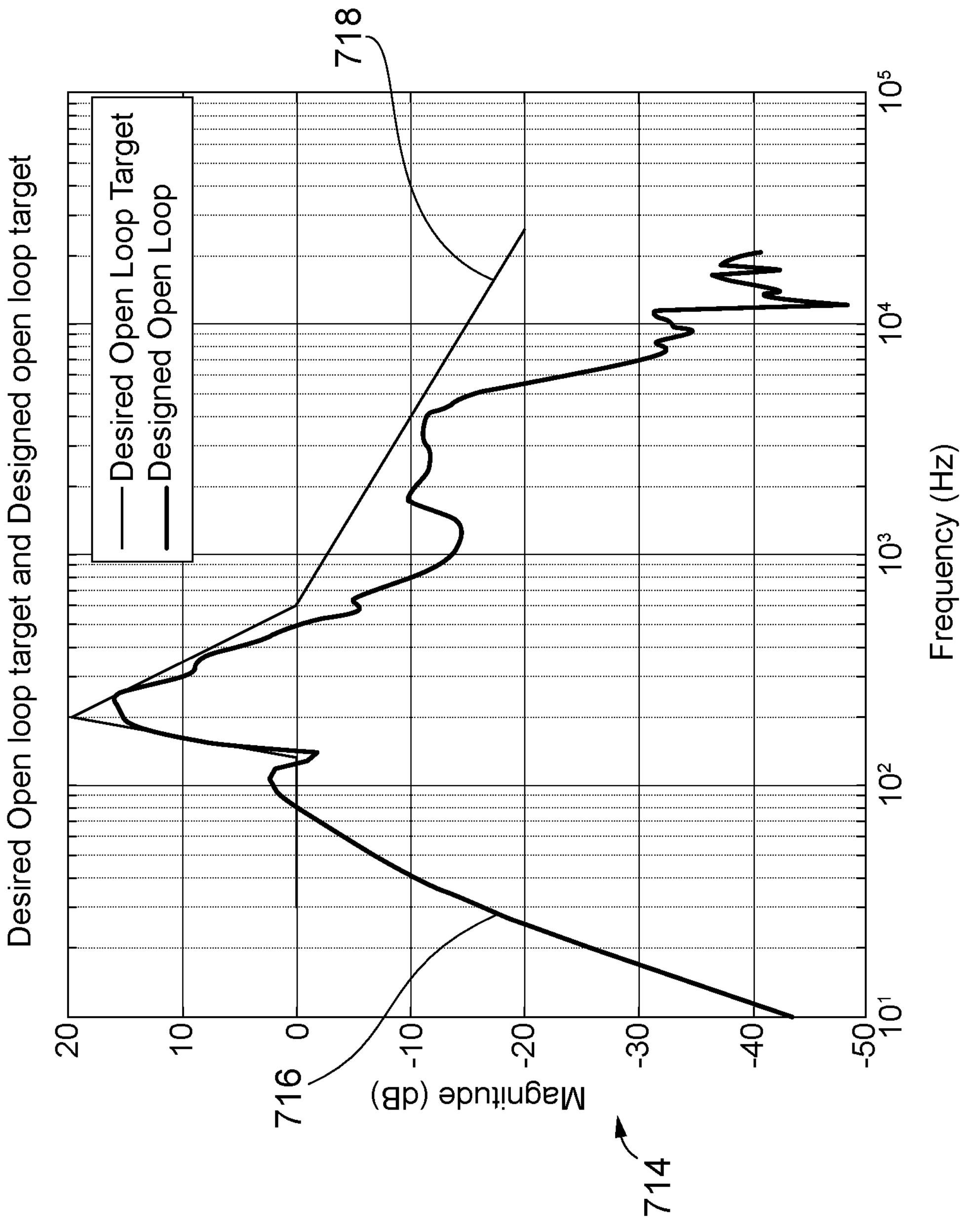

FIG. 7(*a*) shows simulation results for a practical implementation of the ANC headset 100 and includes a magnitude plot 700 for the open loop design target $H_{OL}=H_{FB}\cdot H_{DMFB}$ (reference numeral 702) and for the feedback path transfer function $H_{DMFB}$ (reference numeral 704); a phase plot 706 for the open loop design target $H_{OL}=H_{FB}\cdot H_{DMFB}$ (reference numeral 708) and for the feedback bath transfer function $H_{DMFB}$ (reference numeral 710); and for FBANC as described by equation (7) (reference numeral 712).

FIG. 7(*b*) shows a magnitude plot 714 for the open loop design target $H_{OL}=H_{FB}\cdot H_{DMFB}$ (reference numeral 716) and for the target transfer function $H_T$ (reference numeral 718).

The traces 516, 616, 716 show examples of the open loop design target $H_{OL}$ after application of the methods disclosed herein in providing a $H_{OL}$ that is suitably close to the target transfer function $H_T$.

It is desirable to have a higher open loop gain as this results in better ANC performance. This can be seen from the relationship between open loop gain and ANC suppression. For example, and with reference to FIG. 5(*a*), the frequency range where the open loop gain (numeral 502) is above 0 dB corresponds to ANC suppression in the "ANC Suppression" section of the graph (numeral 512).

Feedback ANC suppression is generally in lower frequency regions from approximately 20 Hz up to 800 Hz with the peak in the range of 100 Hz to 200 Hz depending on the acoustics of the headset.

It can be seen from the typical headset examples shown in FIGS. 5(*a*), 5(*b*), 6(*a*), 6(*b*), 7(*a*), 7(*b*) that the phase response of $H_{DMFB}$ (numeral 510, 610, 710) turns negative between 100 Hz and 200 Hz in all cases. The higher frequencies can also be difficult to cancel because it is difficult to design a filter with open loop response with sufficient gain and phase margin to ensure system stability. Consequently, it is desirable to attenuate higher frequencies to avoid system instability.

The knowledge of the phase response of $H_{DFMB}$ can be used to set the peak of the target transfer function $H_T$ and the absolute suppression level will be limited by the ability to stay within the desired open loop gain and phase stability margins.

The target transfer function $H_T$ may comprise a magnitude being greater than 0 dB in a frequency range from 20 Hz to 800 Hz and/or may comprise a magnitude peak in a frequency range from 100 Hz to 200 Hz and/or may comprise a magnitude less than zero at frequencies greater than 800 Hz.

Figure 8:
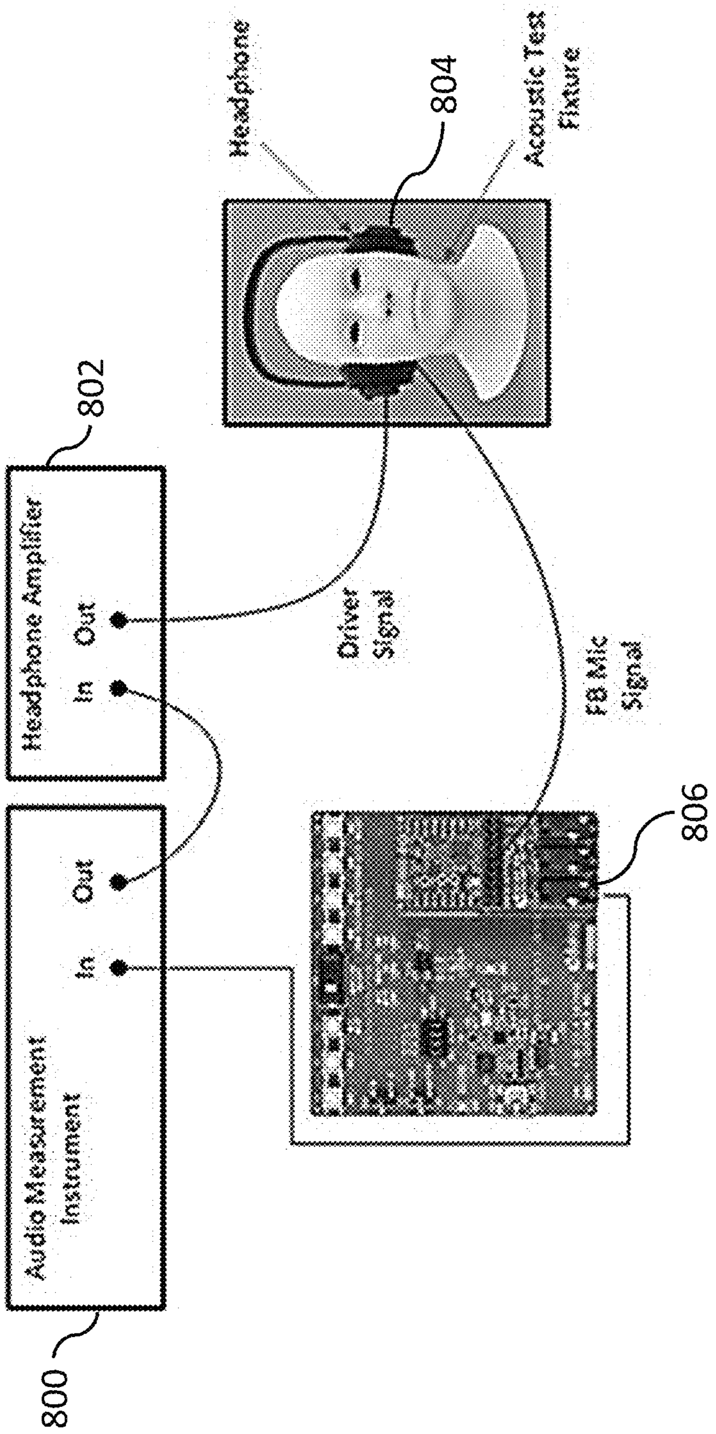
FIG. 8 is a schematic of a feedback ANC acoustical measurement set up for determining the feedback path transfer function.

FIG. 8 is a schematic of a feedback ANC acoustical measurement set up for determining the feedback path transfer function $H_{DMFB}$. It will be appreciated that other methods may be used to determine the feedback path transfer function $H_{DMFB}$, in accordance with the understanding of the skilled person.

An audio measurement instrument 800 is used to generate a frequency sweep from 10 Hz to 20 kHz. This is amplified using a headphone amplifier 802 and used to drive the feedback loudspeaker (part of a headphone 804). The resulting feedback mic signal is captured, and the results are routed through an evaluation board 806 back to the audio measurement instrument 800.

The evaluation board 806, which is configured with a flat frequency response, is included so that its latency is included in the captured result and to provide D/A conversion of the FB mic signal before input to the audio measurement instrument 800.

The evaluation board 806 represents a generic hardware signal path without any ANC filters, i.e. pass through. The only signal change through the evaluation board 806 will be due to the inherent latency/delay from input to output. When the ANC filters are tuned they may be implemented on the evaluation board 806 in this example.

Various improvements and modifications may be made to the above without departing from the scope of the disclosure.

The invention claimed is:

1. A computer-implemented method of automated filter design comprising designing a feedback filter for an active noise cancelling system;
- wherein designing the feedback filter comprises determining a filter transfer function of the feedback filter;
- wherein the filter transfer function is determined using an optimization method;
- wherein determining the filter transfer function comprises:
  - defining an error function that is dependent on an open loop design target and target transfer function, the open loop design target being dependent on the filter transfer function; and
  - applying the optimization method using the error function to determine filter expression for the filter transfer function that either:
    - i) reduces the error function to a sufficiently small value that is indicative of the open loop design target being sufficiently close to the target transfer function; and/or
    - ii) minimizes the error function.

2. The method of claim 1, wherein determining the filter transfer function comprises:
- defining a target transfer function of the feedback filter; and
- applying the optimization method using the target transfer function to determine a filter expression for the filter transfer function.

3. The method of claim 2, wherein defining the target transfer function comprises providing a target transfer function comprising:
- a magnitude being greater than 0 dB in a frequency range from 20 Hz to 800 Hz and/or;
- a magnitude peak in a frequency range from 100 Hz to 200 Hz; and/or
- a magnitude less than zero at frequencies greater than 800 Hz.

4. The method of claim 1, wherein the optimization method is a least square method.

5. The method of claim 4, wherein the open loop design target is dependent on a feedback path transfer function, being representative of feedback from a driver to a feedback microphone.

6. The method of claim 5, wherein the open loop design target is a product of the feedback path transfer function and the filter transfer function.

7. The method of claim 6, wherein the least square method is a weighted least square method such that the error function is dependent on a weighting vector.

8. The method of claim 7, wherein the error function is approximately equal to a magnitude squared of a first expression, the first expression being equal to a square root of the weighting vector multiplied by the difference between the open loop design target and the target transfer function.

9. The method of claim 7, wherein the weighting vector is multiplied by a weighting factor.

10. The method of claim 9, comprising:

a) updating the weighting factor thereby updating the error function;

b) applying the least squares method using the error function to determine an alternative expression for the filter transfer function that either:

i) reduces the error function to a sufficiently small value that is indicative of the open loop design target being sufficiently close to the target transfer function; and/or ii) minimizes the error function;

c) updating the filter expression to the alternative expression if the error function after updating is smaller than the error function prior to updating; and d) repeating steps a) to c) until:

a number of repetitions of the steps a) to c) exceed a limit; and/or the error function is less than a threshold value.

11. The method of claim 7, wherein the weighting vector is proportional to one divided by a magnitude of the target transfer function squared.

12. The method of claim 4, wherein the error function is dependent on the difference between the open loop design target and the target transfer function.

13. The method of claim 4, wherein determining the filter transfer function comprises:

defining a target transfer function of the feedback filter;

determining a filter expression for the open loop design target comprising:

determining a first filter expression, the first filter expression comprising a first numerator polynomial and a first denominator polynomial; and determining the first filter expression by applying the least square method using the target transfer function to determine roots of the first denominator polynomial.

14. The method of claim 13, wherein determining the first filter expression comprises applying the least square method using the target transfer function to determine the roots of the first numerator polynomial after the roots of the first denominator polynomial have been determined.

15. The method of claim 1 comprising designing a feedforward filter for the active noise cancelling system.

16. A computer system comprising a module configured as an automated filter design tool configured to design a feedback filter for an active noise cancelling system;

wherein designing the feedback filter comprises determining a filter transfer function of the feedback filter;

wherein the filter transfer function is determined using an optimization method;

wherein determining the filter transfer function comprises:

defining an error function that is dependent on an open loop design target and target transfer function, the open loop design target being dependent on the filter transfer function; and applying the optimization method using the error function to determine filter expression for the filter transfer function that either:

i) reduces the error function to a sufficiently small value that is indicative of the open loop design target being sufficiently close to the target transfer function; and/or ii) minimizes the error function.

17. An active noise cancelling system comprising a feedback filter being designed using a method of automated filter design comprising designing the feedback filter;

wherein designing the feedback filter comprises determining a filter transfer function of the feedback filter;

wherein the filter transfer function is determined using an optimization method;

wherein determining the filter transfer function comprises:

defining an error function that is dependent on an open loop design target and target transfer function, the open loop design target being dependent on the filter transfer function; and applying the optimization method using the error function to determine filter expression for the filter transfer function that either:

i) reduces the error function to a sufficiently small value that is indicative of the open loop design target being sufficiently close to the target transfer function; and/or ii) minimizes the error function.

* * * * *